(12) United States Patent  (10) Patent No.: US 9,410,691 B2
Lin  (45) Date of Patent: *Aug. 9, 2016

(54) LIGHTED FOOTWEAR

(71) Applicant: Fujian Yibao Optoelectronics Technology Co., Ltd., Nan'an (CN)

(72) Inventor: Jiayang Lin, Nan'an (CN)

(73) Assignee: Fujian Yibao Optoelectronics Technology Co., Ltd., Nan'an (CN)

( * ) Notice: Subject to any disclaimer, the term of this patent is extended or adjusted under 35 U.S.C. 154(b) by 365 days.

This patent is subject to a terminal disclaimer.

(21) Appl. No.: 14/101,108

(22) Filed: Dec. 9, 2013

(65) Prior Publication Data

US 2015/0003047 A1 Jan. 1, 2015

Related U.S. Application Data

(62) Division of application No. 13/932,976, filed on Jul. 1, 2013, now Pat. No. 8,641,220.

(51) Int. Cl.
*F21V 31/00* (2006.01)
*A43B 3/00* (2006.01)
*H05B 37/02* (2006.01)

(52) U.S. Cl.
CPC .............. *F21V 31/005* (2013.01); *A43B 3/001* (2013.01); *H05B 37/029* (2013.01); *H05B 37/0227* (2013.01)

(58) Field of Classification Search
CPC .. F21V 31/005; A43B 3/001; H05B 37/0227; H05B 37/029
See application file for complete search history.

(56) References Cited

U.S. PATENT DOCUMENTS

| | | |
|---|---|---|
| 4,173,035 A | 10/1979 | Hoyt |
| 4,308,572 A | 12/1981 | Davidson et al. |
| 5,052,131 A | 10/1991 | Rondini |
| 5,357,697 A | 10/1994 | Lin |
| 5,375,044 A | 12/1994 | Guritz |
| 5,406,724 A | 4/1995 | Lin |
| 5,457,900 A | 10/1995 | Roy |
| 5,473,518 A | 12/1995 | Haber et al. |
| 5,484,292 A | 1/1996 | McTaggart |
| 5,500,635 A | 3/1996 | Mott |
| 5,575,554 A | 11/1996 | Guritz |
| 5,584,296 A | 12/1996 | Cui et al. |
| 5,599,088 A | 2/1997 | Chien |
| 5,644,858 A | 7/1997 | Bemis |
| 5,722,192 A | 3/1998 | Salley |
| 5,746,499 A | 5/1998 | Ratcliffe et al. |

(Continued)

Primary Examiner — Thomas M Sember
(74) Attorney, Agent, or Firm — Danton K. Mak; Leech Tishman Fuscaldo & Lampl

(57) ABSTRACT

A display apparatus for lighted footwear, having a spring switch, a battery-powered integrated circuit sealingly encapsulated, a plurality of illuminators, and a wiring harness connecting the illuminators to points of the integrated circuit, the integrated circuit being configured for activating the illuminators in a sequential pattern that can include repeated activation cycles when the spring switch is subjected to an effective acceleration. The display apparatus preferably includes the battery being sealingly encapsulated together with the spring switch and the integrated circuit; an ON/OFF switch can be included for selectively producing a deep sleep state of the integrated circuit that is unresponsive to the spring switch. Also disclosed is footwear incorporating the display apparatus, wherein the encapsulated enclosure is located within a sole heel portion of the shoe, and the illuminators are distributed on the footwear for external view.

28 Claims, 6 Drawing Sheets

(56) References Cited

U.S. PATENT DOCUMENTS

| | | |
|---|---|---|
| 5,746,500 A | 5/1998 | Chien |
| 5,758,946 A | 6/1998 | Chen |
| 5,761,040 A | 6/1998 | Iwasa et al. |
| 5,769,533 A | 6/1998 | Yamuro et al. |
| 5,813,148 A | 9/1998 | Guerra |
| 5,815,955 A | 10/1998 | Wu |
| 5,821,858 A | 10/1998 | Stone |
| 5,879,069 A | 3/1999 | Chien |
| 5,886,886 A | 3/1999 | Teng |
| 5,903,103 A | 5/1999 | Garner |
| 5,909,088 A | 6/1999 | Wut |
| 5,931,577 A | 8/1999 | Ishibashi |
| 5,947,580 A | 9/1999 | Chien |
| 5,955,957 A | 9/1999 | Calabrese et al. |
| 6,012,822 A | 1/2000 | Robinson |
| 6,021,306 A | 2/2000 | McTaggart |
| 6,104,140 A | 8/2000 | Wut et al. |
| 6,113,248 A | 9/2000 | Mistopoulos et al. |
| 6,280,045 B1 | 8/2001 | Anteby et al. |
| 6,619,812 B2 | 9/2003 | Rapisarda |
| 6,858,993 B2 | 2/2005 | Lee et al. |
| 6,874,904 B2 | 4/2005 | Hsu |
| 6,965,205 B2 | 11/2005 | Piepgras et al. |
| 6,991,342 B2 | 1/2006 | Gonet |
| 7,004,598 B2 | 2/2006 | Wong |
| 7,029,140 B2 | 4/2006 | Wong et al. |
| 7,030,855 B2 | 4/2006 | Metcalf |
| 7,057,354 B2 | 6/2006 | Wong et al. |
| 7,071,828 B2 | 7/2006 | Wong |
| 7,131,744 B2 | 11/2006 | Lee |
| 7,181,870 B2 | 2/2007 | Guzman |
| 7,254,910 B2 | 8/2007 | Guzman |
| 7,255,468 B2 | 8/2007 | Capriola |
| 7,481,010 B2 | 1/2009 | Chen |
| 7,494,237 B1 | 2/2009 | Cheung |
| 7,497,037 B2 | 3/2009 | Vick et al. |
| 7,510,293 B2 | 3/2009 | Chyn |
| 7,614,166 B2 | 11/2009 | Vick et al. |
| 7,794,101 B2 | 9/2010 | Galica et al. |
| 7,866,066 B2 | 1/2011 | Forbes |
| 7,882,585 B2 | 2/2011 | Cheung |
| 7,908,774 B2 | 3/2011 | Mirza et al. |
| 7,997,007 B2 | 8/2011 | Sanabria-Hernandez |
| 8,056,269 B2 | 11/2011 | Beers et al. |
| 8,069,589 B2 | 12/2011 | Guzman |
| 8,281,440 B2 | 10/2012 | Cheung |
| 8,327,561 B1 | 12/2012 | Smith, III |
| 8,356,430 B2 | 1/2013 | Beers |
| 2002/0145865 A1 | 10/2002 | Gregg |
| 2003/0072156 A1 | 4/2003 | Pohlert et al. |
| 2005/0018417 A1 | 1/2005 | Chien |
| 2006/0007668 A1 | 1/2006 | Chien |
| 2006/0007670 A1 | 1/2006 | Chien |
| 2006/0230642 A1 | 10/2006 | Vick et al. |
| 2007/0041193 A1 | 2/2007 | Wong et al. |
| 2007/0151125 A1 | 7/2007 | Tsai et al. |
| 2007/0201221 A1 | 8/2007 | Cherdak et al. |
| 2008/0019119 A1 | 1/2008 | Marston |
| 2008/0019120 A1 | 1/2008 | Rapisarda |
| 2009/0034237 A1 | 2/2009 | Peckham, Jr. |
| 2009/0193689 A1 | 8/2009 | Galica et al. |
| 2009/0251077 A1 | 10/2009 | Wilborn et al. |
| 2010/0170115 A1 | 7/2010 | Smith, Iii |
| 2010/0238650 A1 | 9/2010 | Haney |
| 2011/0199779 A1 | 8/2011 | Chu |
| 2013/0007949 A1 | 1/2013 | Kurs et al. |

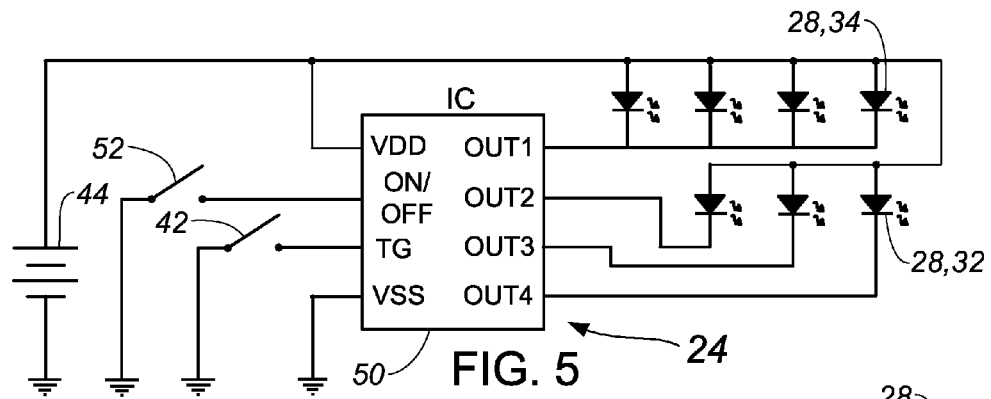
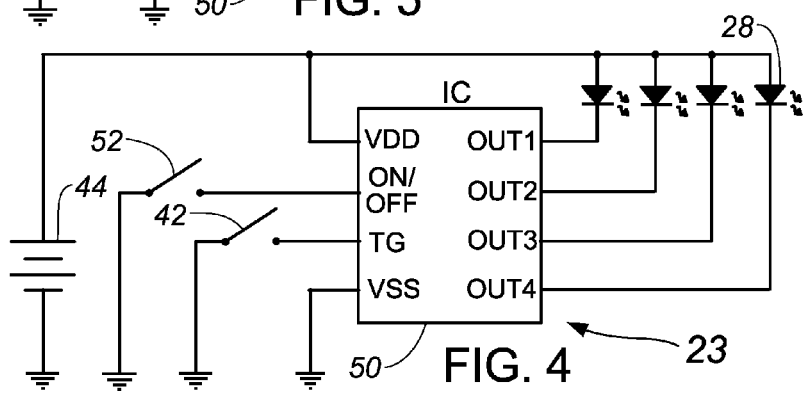
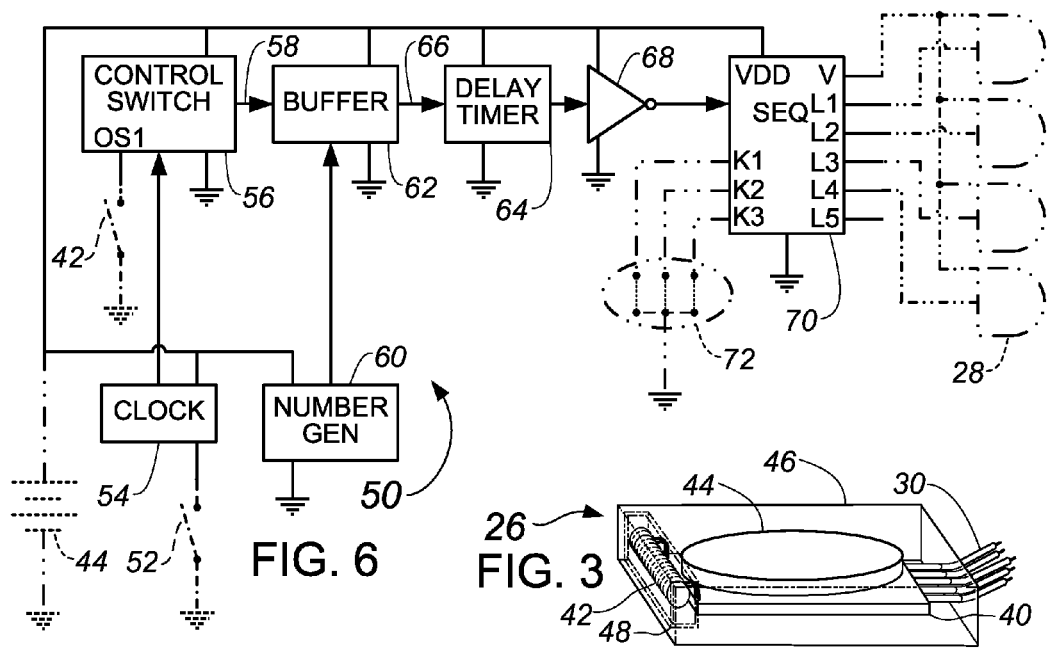

LIGHTED FOOTWEAR

BACKGROUND

The present invention relates to illuminated devices, and more particularly to illuminated footwear such as shoes, slippers, and sandals.

Illuminated shoes and other forms of lighted footwear are known. See, for example, U.S. Pat. No. 5,052,131 to Rondini, U.S. Pat. No. 5,500,635 to Mott, U.S. Pat. No. 5,821,858 to Stone, and U.S. Pat. No. 5,879,069 to Chien. The Rondini patent discloses a pressure switch located in the heel portion of a sandal for activating a timer for flashing LEDs located in straps of the sandal when the sandal is worn. The Mott patent discloses a piezoelectric sensor molded within a shoe sole for triggering a lighting circuit that can include a microprocessor. The Stone patent discloses a counter circuit and logic gated for sequentially illuminating LEDs upon activation of a pressure switch located in an insole. The Chien patent discloses the use of electro-illuminated strips incorporated in a lace or strap.

While the prior art does exhibit a variety of decorative features it is believed that none is entirely satisfactory, having one or more of the following disadvantages:
1. They are unreliable in that piezoelectric sensors located in sole regions subject to flexing can become degraded or inoperative over time, and conventional pressure switches can stick in an open or closed condition;
2. They are unreliable in that sensitive components are not sufficiently protected from moisture, etc.;
3. They exhibit excessive power consumption; and
4. They fail to present a desired level of attractiveness.

Thus there is a need for improved illuminated footwear that overcomes at least some of the above disadvantages.

SUMMARY

The present invention meets this need by providing footwear having an encapsulated integrated circuit module that incorporates an inertia switch for activating the integrated circuit from a deep sleep state thereby to drive an array of illuminators that are variously incorporated in the footwear. In one aspect of the invention, a display apparatus includes an encapsulated circuit module enclosing an inertia switch including a stationary element and an elastic element, the elements being electrically conductive and making contact when the switch is subjected to an effective acceleration, the module also enclosing a battery-powered logic circuit electrically connected to the inertia switch, and an end portion of a wiring harness that incorporates a plurality of illuminators, the harness connecting the illuminators to plural points of the logic circuit.

Preferably the activation sequence includes a repeated plurality of activation cycles, successive activation cycles being spaced by an inter-cycle rest interval. Further preferably, the activation sequence has a single pair only of the activation cycles. Preferably at least some of the illuminators are flashed sequentially at least once in each activation cycle. Further, the sequential flashings can be spaced by an intra-cycle interval, the intra-cycle interval being shorter than the inter-cycle rest interval.

The logic circuit of the display apparatus is preferably a CMOS integrated circuit. Preferably an ON/OFF switch is connected to the logic circuit for selectively producing a deep sleep state in which the logic circuit is unresponsive to the inertia switch. The CMOS integrated circuit can include a control switch and a clock circuit, the control switch being connected to the inertia switch and the clock circuit, the clock circuit being connected to the ON/OFF switch, the deep sleep state being produced by the clock circuit being disabled in response to operation of the ON/OFF switch. Preferably the ON/OFF switch makes momentary contact, the deep sleep state being entered and exited in response to alternate activations of the ON/OFF switch.

Preferably the battery is sealingly encapsulated together with the logic circuit in the enclosure. Alternatively, a rechargeable battery module powers the logic circuit, and the display apparatus can further include a protective charging circuit.

In another aspect of the invention, lighted footwear includes the display apparatus in a footwear structure including a sole having toe and heel portions, and an upper for confining a wearer's foot on the sole, wherein the encapsulated enclosure is located within the heel portion of the sole, and the illuminators are distributed on the footwear structure for external view. The upper can have a closure in the form of a fastening strap, at least some of the illuminators being located on the fastening strap.

Preferably an ON/OFF switch is connected through the wiring harness to the logic circuit, the ON/OFF switch being located on the upper for selectively blocking the activation sequence. Preferably the CMOS integrated circuit includes a control switch and a clock circuit, the control switch being connected to the inertia switch and the clock circuit, the clock circuit being connected to the ON/OFF switch, the deep sleep state being produced by the clock circuit being disabled in response to operation of the ON/OFF switch. Preferably the ON/OFF switch makes momentary contact, the deep sleep state being entered and exited in response to alternate activations of the ON/OFF switch.

When the display apparatus includes the rechargeable battery module, the shoe can further include the protective charging circuit, with the charging circuit being located in the sole or in a fastening strap of the shoe.

DRAWINGS

These and other features, aspects, and advantages of the present invention will become better understood with reference to the following description, appended claims, and accompanying drawings, where:

FIG. 3 is a perspective detail view a circuit module within region 3 of FIG. 2;

FIG. 4 is an electrical schematic of a display apparatus incorporating the circuit module of FIG. 3;

FIG. 5 is an electrical schematic showing an alternative configuration of the display apparatus of FIG. 4 as implemented in the shoe of FIGS. 1 and 2;

FIG. 6 is a block diagram of an integrated circuit portion of the circuit module of FIG. 3;

DESCRIPTION

Figure 2:
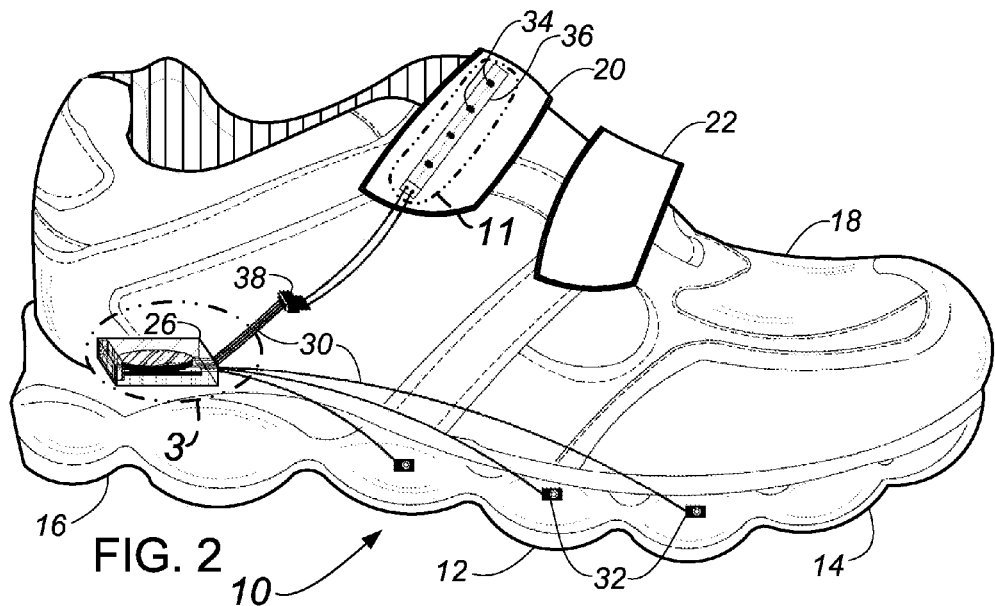
FIG. 2 is a side perspective phantom view showing the shoe of FIG. 1 in further detail.
Figure 1:
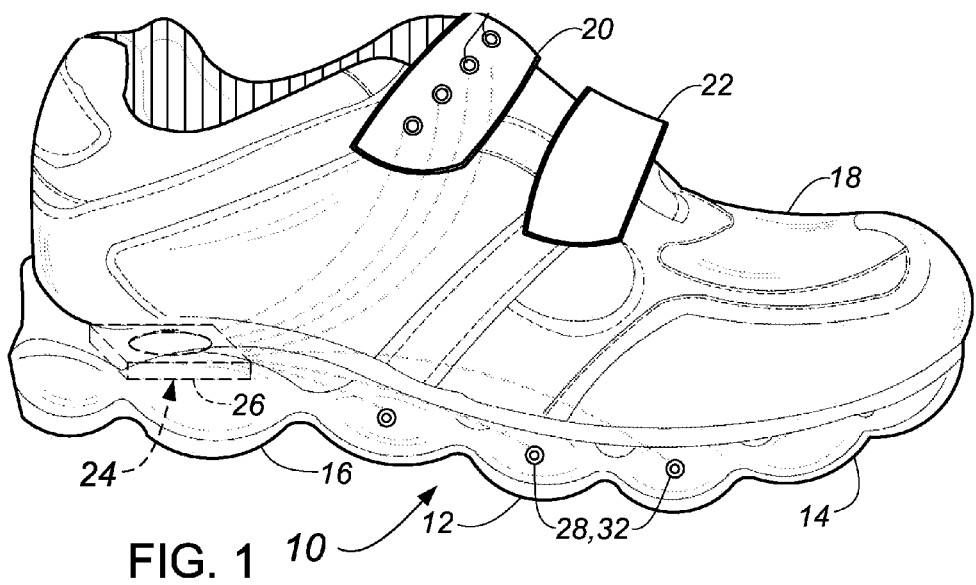
FIG. 1 is a side perspective view of a shoe incorporating the present invention.

The present invention is directed to a display apparatus having flashing illuminators, and footwear incorporating the display apparatus. With reference to FIGS. 1 and 2 of the drawings, a shoe 10 includes as main structural elements a sole 12 having a toe portion 14 and a heel portion 16, and an upper 18 including a pair of fastening straps, respectively designated first strap 20 and second strap 22.

According to the present invention the shoe 10 also incorporates a display apparatus 24 comprising a rigidly sealingly encapsulated circuit module 26 enclosed within the heel portion of the sole 12, a plurality of illuminators 28, and a wiring harness 30 electrically connecting the illuminators 28 to the circuit module 26, the harness 30 being depicted by dashed lines in FIG. 1. Further, the illuminators 28 can include a plurality of sole illuminators 32 and an additional plurality of strap illuminators 34. It will be understood that the harness 30 can include individual pairs of conductors connecting each of the illuminators 28 to the circuit module 26, and portions of at least some of the conductors can be bundled together using suitable sleeving or ties (not shown). As further described below with reference to FIG. 14, the display apparatus 24 is configured for flashing the illuminators in an activation sequence that can include a repeated plurality of activation cycles, there being preferably two such activation cycles in the sequence for enhanced attractiveness of the illuminated display.

As further shown in FIG. 2, the harness 30 can include a printed circuit strip 36 that extends within the fastening strap 20 for connecting the strap illuminators 32, and a miniature electrical connector 38 can be interposed in conductors of the harness that extend between the circuit strip 36 and the circuit module 26 the connector 38 facilitating manufacture and assembly of the shoe 10.

With further reference to FIG. 3, the circuit module 26 includes a circuit board 40, an inertia switch 42, and a battery 44, the components of the circuit module being encapsulated within a rigid potting material 46. An exemplary implementation of the inertia switch 42 is a spring switch that is enclosed within a transparent housing 48, being commercially available as Model SW-28020P from Yueqing Xietong Electronics Co., Ltd. of Yueqing City, Zhejiang, China. The housing 48 advantageously provides clearance for the spring switch within the potting material 46. The battery can be a commonly available CR2032 LiMn button battery, which provides 210 ma/A at 3 volts.

With further reference to FIG. 4, a display apparatus 23 includes a logic circuit 50 having separate electrical connections to a plurality (4) of the illuminators 28, the illuminators being light-emitting diodes (LEDs), the illuminators also having a common connection to the battery 44, the battery also powering the logic circuit 50, the logic circuit being preferably in the form of a CMOS integrated circuit. The inertia switch 42 is connected to a trigger input of the logic circuit and, optionally, an ON/OFF switch 52 is connected to a corresponding input of the logic circuit 50. When present, the ON/OFF switch 52 selectively blocks initiation of the activation sequence. Preferably the ON/OFF switch is configured as a momentary push-button, alternate operations of the switch producing a "deep sleep" condition of the logic circuit 50 that is unresponsive to the inertia switch 42. The physical arrangement is preferably as shown and described above in connection with FIG. 3, the inertia switch 42, the battery 44, and the logic circuit 50 being connected through the circuit board 40, the logic circuit 50 being packaged as a surface-mount device.

With further reference to FIG. 5, the display apparatus 24 of FIG. 2 is configured much like that of FIG. 4, except that there are seven of the illuminators 28, three of them being connected to separate outputs of the logic circuit 50 as in FIG. 4 and providing the sole illuminators 32, four of them being connected in parallel to a single output of the logic circuit 50 and providing the strap illuminators 34.

With further reference to FIG. 6, an exemplary and preferred implementation of the logic circuit 50 includes a clock 54 that is enabled by the ON/OFF switch 52, the clock feeding a control switch 56 that produces a control signal 58 in response to the inertia switch 42 conditionally when the clock is enabled. A pseudo-random number generator 60 feeds a buffer 62, the buffer being responsive to the control signal 58 for activating a delay timer 64 with a random number 66, the timer in turn feeding an inverter 68 that activates a light sequence generator 70 for driving the illuminators 28. The battery provides a VDD voltage of between 2.2 and 5 volts to the clock, the control switch, the pseudo-random number generator, the buffer, the delay timer, the inverter, and the sequence generator. The sequence generator provides a common voltage V to the illuminators, there being five separate generator outputs designated L1, L2, L3, L4, and L5 for independently pulsing the illuminators 28. Four of the illuminators 28 are shown in FIG. 6, corresponding to the circuit diagram of FIG. 4, the output L5 being unused. Preferably the sequence generator 70 is programmable for utilizing a single integrated circuit configuration to provide a variety of predetermined activation sequences. To this end, the sequence generator is provided with three program inputs designated K1, K2, and K3. Using suitable jumper connections 72, as many as eight different activation sequences can be provided in a single configuration of the sequence generator. The flashing can be simultaneous or sequential.

Figure 7:
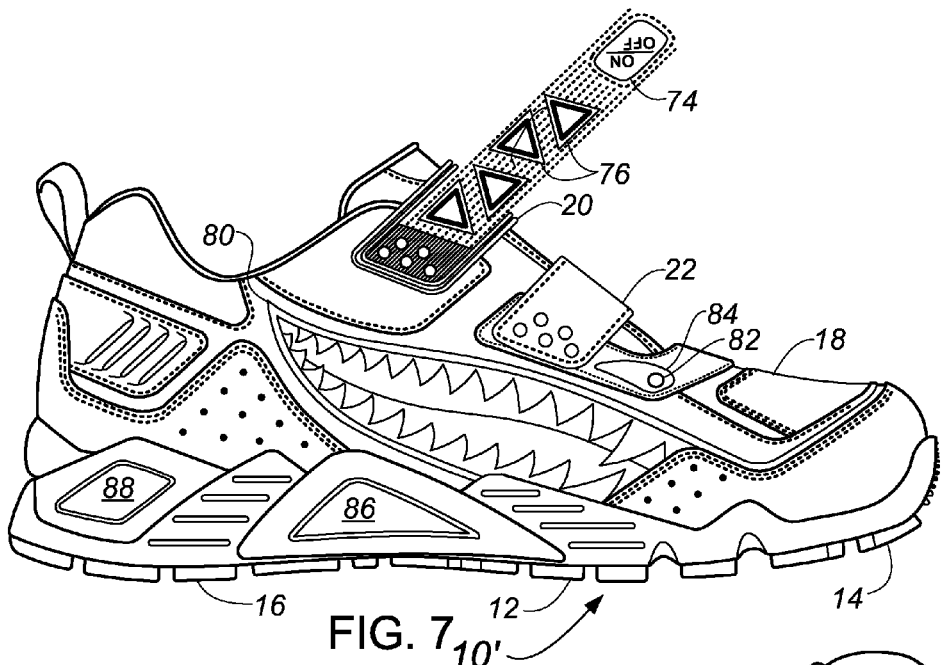
FIG. 7 is a diagrammatic side view showing an alternative configuration of the shoe of FIGS. 1 and 2.
Figures 8, 9:
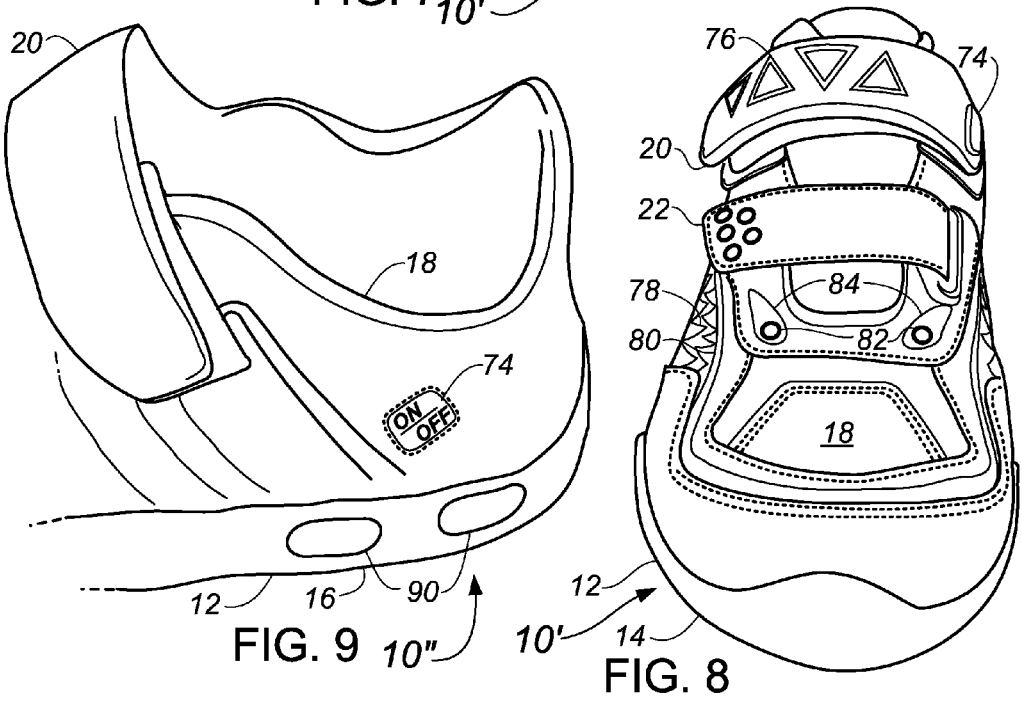
FIG. 8 is a front perspective view of the shoe of FIG. 7.
FIG. 9 is an elevational perspective detail view showing a heel portion of another alternative configuration of the shoe of FIGS. 1 and 2.

With further reference to FIGS. 7 and 8, an alternative configuration of the shoe, designated 10', incorporates the optional but preferred ON/OFF switch 52 (not shown) within the first strap 20, the switch being hidden by a flexible cover 74. Further, counterparts of the strap illuminators 34 are implemented as triangular pattern illuminators 76 as further described below in connection with FIG. 13. In addition, the shoe 10' is provided with markings simulating the head of a fearsome carnivore. In particular, opposite sides of the upper 18 have teeth markings 78 and lip markings 80. This motif is enhanced by the inclusion of a pair of oppositely disposed eye illuminators 82 that are located within respective eye markings 84 forward of the second strap 22. Additionally, an elongate counterpart of the triangular pattern illuminator, designated 86, is spaced below the lip marking 80 on an outside portion of the upper 18, and a diamond pattern illuminator 88 is spaced rearwardly of the illuminator 86 above the heel portion 16 of the sole 12.

With further reference to FIG. 9, another alternative configuration of the shoe, designated 10'', incorporates counterparts of the sole illuminators 34, being implemented as elliptical pattern illuminators 90 that are spaced along the heel portion 16 of the outsole 12, the illuminators 90 being further described below in connection with FIG. 12. Also, the ON/OFF switch 52 (not shown) is located under a counterpart of the flexible cover 74 on the upper 18, above the illuminators 84.

Figure 10:
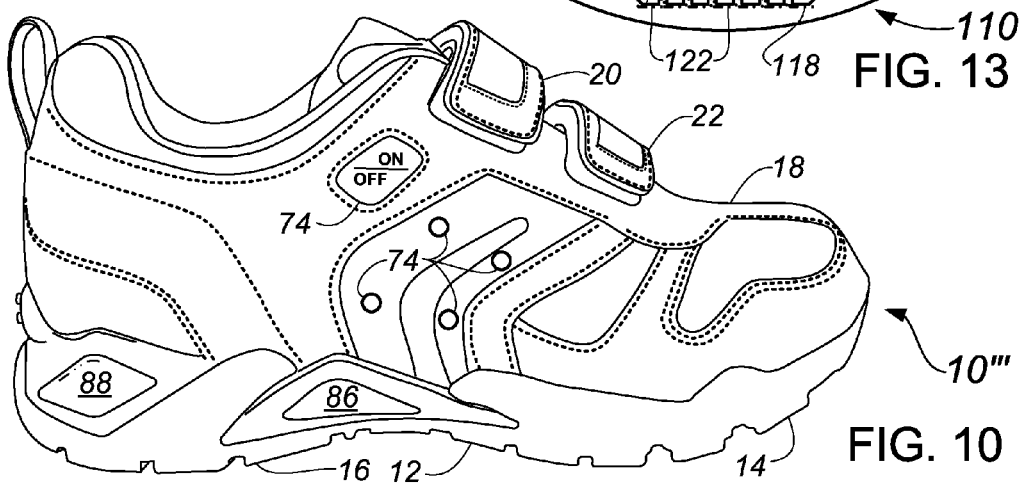
FIG. 10 is a side perspective view showing a further alternative configuration of the shoe of FIGS. 1 and 2.

With further reference to FIG. 10, a further alternative configuration of the shoe, designated 10''', has counterparts of the illuminators 28 located in a spaced array on the upper 18 below the first strap 20. Counterparts of the elongate triangular illuminator 86 and the diamond pattern illuminator 88 can be provided on the shoe 10'''.

Figure 11:
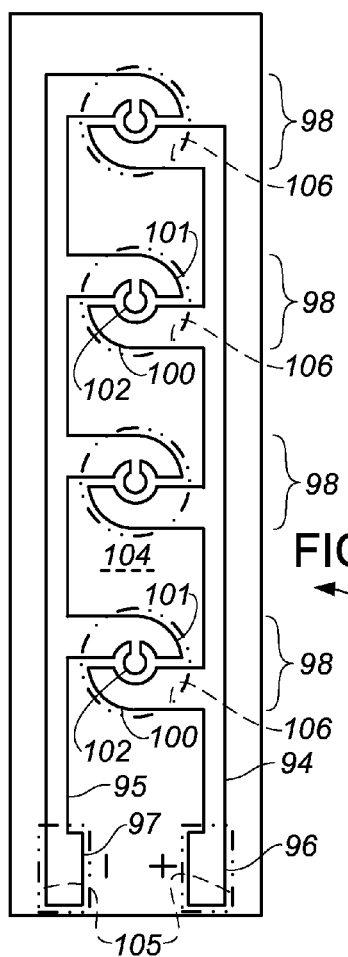
FIG. 11 is a plan view of a printed circuit strip within region 11 of FIG. 2.

With further reference to FIG. 11, a rectangular flexible circuit board 92 that can be used in the flexible circuit strip 36 of FIG. 2 includes a pair of printed circuit traces, designated positive trace 94 and negative trace 95, the traces defining respective solder pads 96 and 97 for external wiring, and mounting pad patterns 98 for four surface-mount LEDs. The pad patterns 98 are advantageously configured for enhanced heat dissipation from the LEDs to be mounted thereon. In particular, the positive trace 94 has respective semicircular enlargements 100 forming one side of each pad pattern, and the negative trace 95 has oppositely extending semicircular enlargements 101, and an inwardly projecting minor enlargement 102 extending to directly under where the LED is intended to be mounted. The circuit board preferably includes a protective covering 104 having openings 105 and 106 for exposing the solder pads 96 and 97, and the pad patterns 98, the openings being depicted by broken lines in FIG. 11. Preferably the covering includes a suitable adhesive and an electrically conductive layer that is isolated from the traces 94 and 95 to provide electromagnetic shielding.

Figure 12:
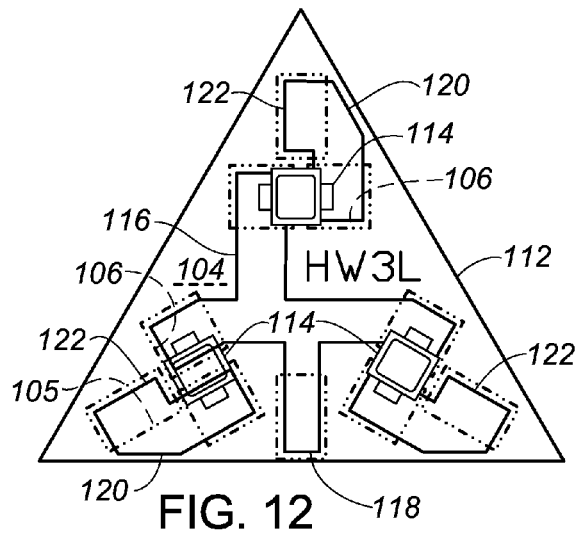
FIG. 12 is a plan view as in FIG. 11, showing a printed circuit providing a triangular illumination pattern.

FIG. 12 shows a circuit module 110 for providing the triangular illuminators of the shoe 10' of FIGS. 7 and 8, including a printed circuit board 112 and a triangularly spaced array of surface-mount LEDs 114. A common trace 115 includes a common solder pad 116 and is connected to one side of each LED. Individual traces 117 connect opposite sides of the LEDs to corresponding solder pads 118. A counterpart of the protective covering 104 has counterparts of the openings 105 and 106 for exposing the solder pads 116 and 118, and pad patterns for the LEDs 114, the openings being depicted by broken lines as in FIG. 11.

Figure 13:
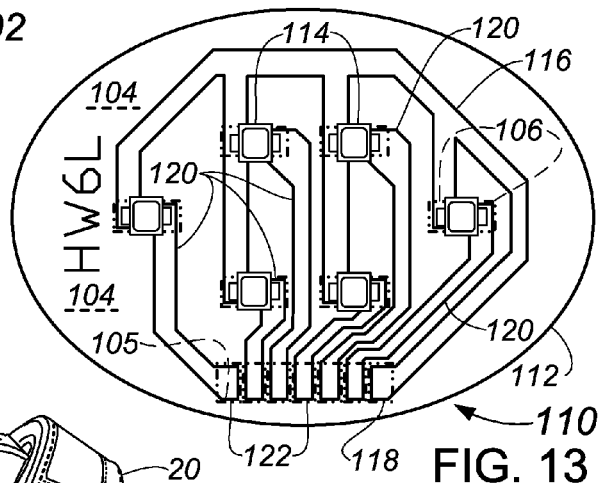
FIG. 13 is a plan view as in FIG. 11, showing a printed circuit providing an elliptical illumination pattern.

FIG. 13 shows a circuit module 120 for providing the elliptical illuminators of the shoe 10'' of FIG. 9, including a printed circuit board 122 and another spaced array of surface-mount LEDs 114. A common trace 125 includes a common solder pad 126 and is connected to one side of each LED. Individual traces 127 connect opposite sides of the LEDs to corresponding solder pads 128. As in the circuit module 110 of FIG. 12, a counterpart of the protective covering 104 includes counterparts of the openings 105 and 106 for exposing the solder pads 126 and 128, and pad patterns for the LEDs 114.

Figure 14:
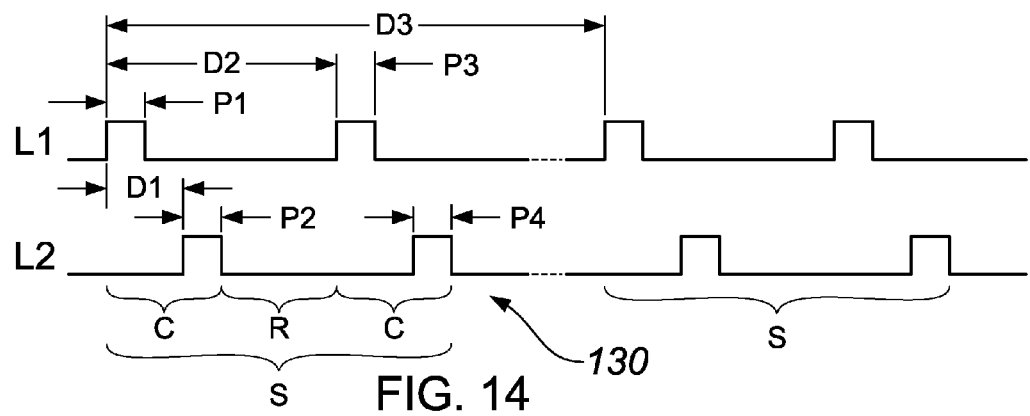
FIG. 14 is a timing diagram of a display sequence according to the present invention.

With further reference to FIG. 14, the display apparatus 24 is operative for producing a display sequence 130 in which successive activations of the inertia switch 42 flash the illuminators 28 in timed activation sequences S, each such sequence including a plurality of preferably two activation cycles C. In each activation cycle a first subset of the illuminators, such as one or more of the illuminators 28 being connected to the output L1 of the light sequence generator 70 of the logic circuit 50, is flashed for a pulse duration P1. Following a first delay D1 from the beginning of the cycle a second subset of the illuminators being connected to the output L2 of the generator 70 is similarly flashed for a pulse duration P2. Following an inter-cycle rest interval R, the cycle C is repeated, there being a second delay D2 between the onset of the one cycle C and that of a next cycle. In FIG. 14 the repeated cycle has the illuminator(s) connected to the output L1 being flashed for a pulse duration P3, and similarly for the output L2, a pulse duration P4. Typically each of the pulse durations is for the same amount of time, such as 0.24 ms, with delays between pulses being, for example, 0.14 ms. In FIG. 14, P1, P2, P3, and P4 would each be 0.24 ms, D1 would be 0.38 ms, etc. Of course it will be understood that the durations may be different if desired. As indicated above, there are preferably two only of the cycles C in each activation sequence; further, it is preferred that a new activation sequence is prevented until after a third delay D3 from the onset of a prior sequence, the third delay D3 being greater than the sum of the first delay D1, the second delay D2, and the pulse duration P4.

Figure 15:
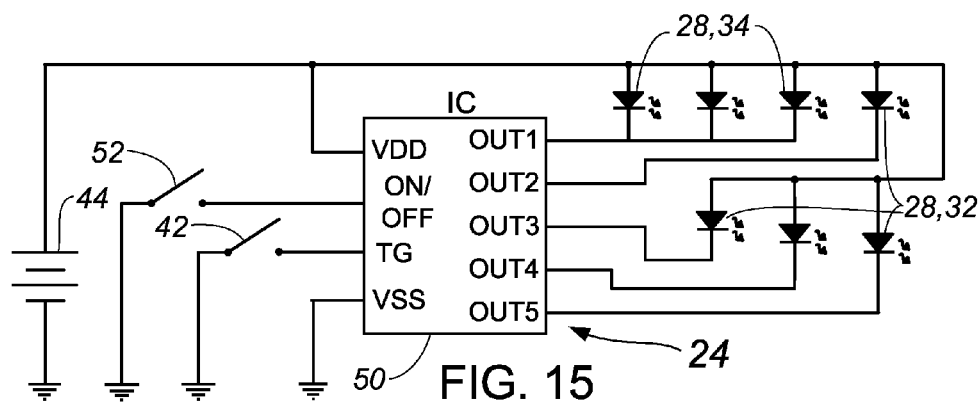
FIG. 15 is an electrical schematic showing another alternative configuration of the display apparatus of FIG. 4.

With further reference to FIG. 15, another configuration of the display apparatus, designated 25, is configured much like that of FIG. 5, except that of the seven of the illuminators 28, three of them are connected in parallel to a single output of the logic circuit 50 and providing the strap illuminators 34, four of them being connected in parallel to a single output of the logic circuit 50 and providing the sole illuminators 32. It will be understood that the connections to the sole and strap illuminators 32 and 34 can be reversed such that the sole illuminators operate in unison whereas the strap illuminators 34 are independently activated.

Figure 16:
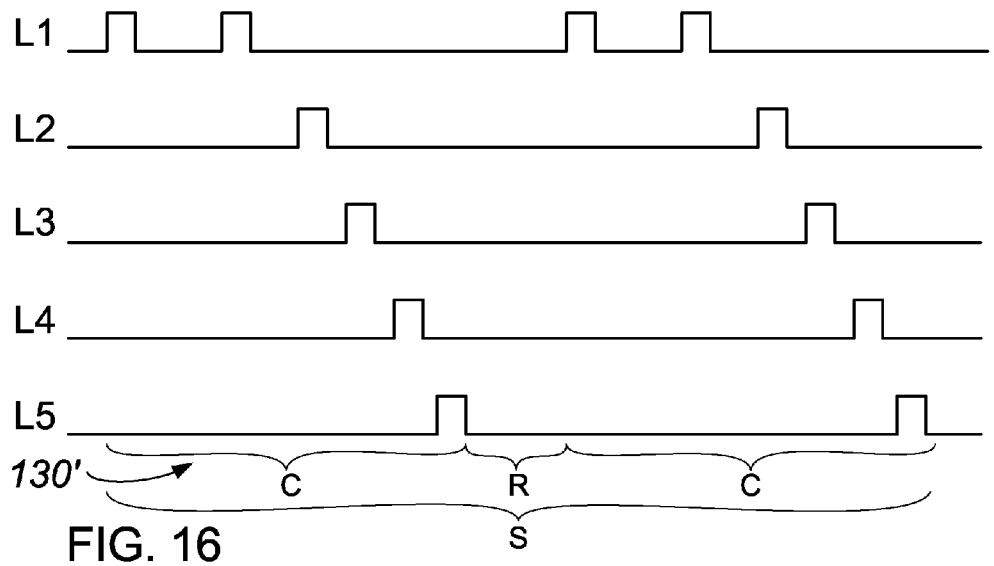
FIG. 16 is a timing diagram as in FIG. 14, showing an alternative display sequence as produced by the display apparatus of FIG. 15.

FIG. 16 is an exemplary timing diagram of the display apparatus 25 of FIG. 15, having a counterpart of the display sequence, designated 130'. In each activation cycle C of the sequence 130' there are two pulses from output L1, followed, sequentially, by a pulse from each of the outputs L2, L3, L4, and L5, respectively, the two activation cycles C being separated by a counterpart of the inter-cycle rest interval R.

Figure 17:
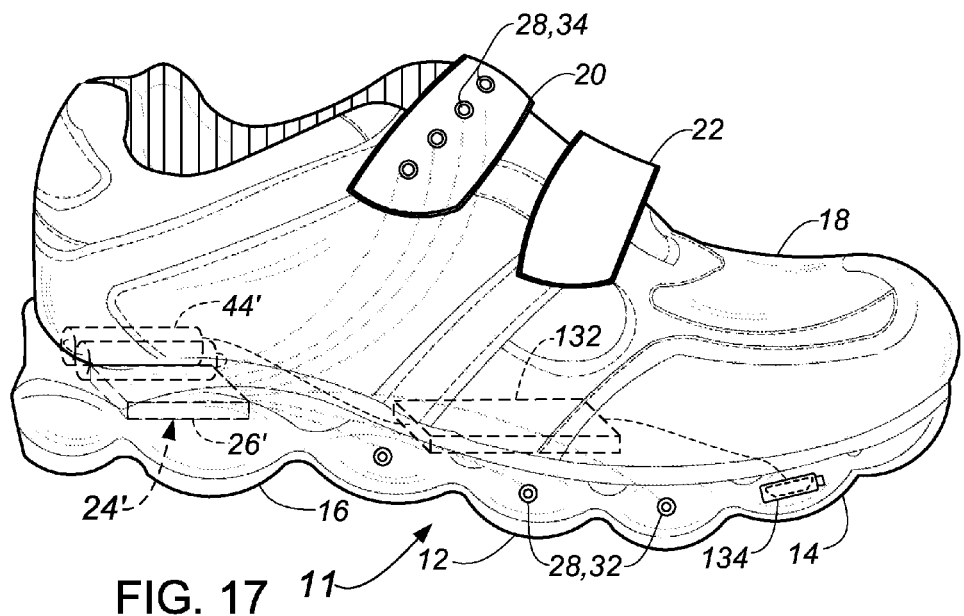
FIG. 17 is a side perspective view as in FIG. 1, showing a further alternative configuration of the shoe.

With further reference to FIG. 17, another alternative configuration of the shoe, designated 11, has a pair of rechargeable battery cells, collectively designated 44' substituted for the battery 44. In the exemplary configuration shown in FIG. 17, the rechargeable battery cells 44' are located within the heel portion 16 but external to the circuit module 26. A protective charging circuit 132 for the rechargeable cells 44' is located in the sole 12, and a charging plug 134 for powering the charging circuit is located at an edge portion of the sole 12. A rechargeable lithium polymer battery pack providing 3.7 Volts at 500 mA suitable for providing the rechargeable battery cells 44' is commonly available from a variety of sources. Similarly, protective charging circuits for these rechargeable battery packs are also available. The charging plug 134 can be configured for receiving a mini-USB cable.

Figure 18:
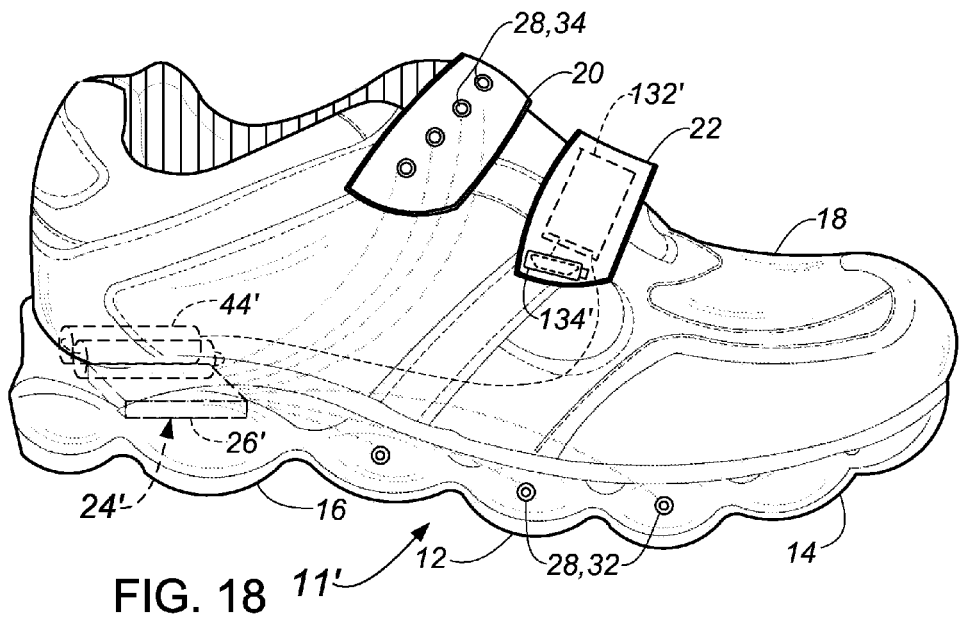
FIG. 18 is a side perspective view showing an alternative configuration of the shoe of FIG. 17.

With further reference to FIG. 18, yet another alternative configuration of the shoe, designated 11', has a counterpart of the charging circuit, designated 132', located within the second fastening strap 22 of the shoe. Preferably the charging circuit 132' incorporates flexible circuitry permitting physical flexing of the second fastening strap 22. It will be understood that the placement of the rechargeable battery cells 44', as well as the charging circuit 132 or 132' and the charging plug 134 may be dictated by the structural configuration of the shoe.

Although the present invention has been described in considerable detail with reference to certain preferred versions thereof, other versions are possible. For example, the charging plug can transmit signals for altering the display sequence, and the protective charging circuit can be located externally of the shoe. Therefore, the spirit and scope of the appended claims should not necessarily be limited to the preferred versions contained herein.

What is claimed is:

1. A display apparatus comprising:
   a. a circuit module comprising:
      i. an inertia switch comprising a stationary element and an elastic element, the elements being electrically conductive and making contact when the inertia switch is subjected to an effective acceleration;
      ii. a logic circuit electrically connected to the inertia switch;
      iii. a battery for powering the integrated circuit; and
      iv. an enclosure sealingly encapsulating the inertia switch and the logic circuit
   b. a plurality of illuminators; and
   c. a wiring harness connected to the illuminators outside the enclosure and having an end portion sealingly extending into the enclosure and connecting the illuminators to plural points of the logic circuit, the logic circuit being configured for activating the illuminators in a predetermined activation sequence upon the inertia switch being subjected to the effective acceleration, the activation sequence comprising a repeated plurality of activation cycles, successive activation cycles being spaced by an inter-cycle rest interval, wherein at least some of the illuminators are flashed sequentially at least once in each activation cycle.

2. The display apparatus of claim 1, the activation sequence having a single pair only of the activation cycles.

3. The display apparatus of claim 1, wherein the sequential flashings are spaced by an intra-cycle interval, the intra-cycle interval being shorter than the inter-cycle rest interval.

4. The display apparatus of claim 1, wherein the logic circuit comprises a CMOS integrated circuit.

5. The display apparatus of claim 4, further comprising an ON/OFF switch connected to the logic circuit for selectively producing a deep sleep state in which the logic circuit is unresponsive to the inertia switch.

6. The display apparatus of claim 5, wherein the CMOS integrated circuit comprises a control switch and a clock circuit, the control switch being connected to the inertia switch and the clock circuit, the clock circuit being connected to the ON/OFF switch, the deep sleep state being produced by the clock circuit being disabled in response to operation of the ON/OFF switch.

7. The display apparatus of claim 6, wherein the ON/OFF switch makes momentary contact, the deep sleep state being entered and exited in response to alternate activations of the ON/OFF switch.

8. The display apparatus of claim 1 wherein the battery is sealingly encapsulated within the enclosure.

9. The display apparatus of claim 1 wherein the battery comprises a rechargeable battery module.

10. The display apparatus of claim 9, further comprising a protective charging circuit connected to the battery module.

11. Lighted footwear, comprising:
   a. footwear structure comprising a sole having toe and heel portions, and an upper for confining a wearer's foot on the sole; and
   b. the display apparatus of claim 1, wherein:
      i. the encapsulated enclosure is located within the heel portion of the sole; and
      ii. the illuminators are distributed on the footwear structure for external view.

12. The lighted footwear of claim 11, wherein the upper comprises a closure in the form of a fastening strap, at least some of the illuminators being located on the fastening strap.

13. The lighted footwear of claim 12, wherein at least some of the illuminators are flashed sequentially at least once in each activation cycle.

14. The lighted footwear of claim 13, wherein the sequential flashings are spaced by an intra-cycle interval, the intra-cycle interval being shorter than the inter-cycle rest interval.

15. The lighted footwear of claim 11, further comprising an ON/OFF switch connected through the wiring harness to the logic circuit, the ON/OFF switch being located on the upper for selectively blocking the activation sequence.

16. The lighted footwear of claim 11, wherein the activation sequence comprises a repeated plurality of activation cycles, successive activation cycles being spaced by an inter-cycle rest interval.

17. The lighted footwear of claim 16, the activation sequence having a single pair only of the activation cycles.

18. The lighted footwear of claim 11, wherein the logic circuit comprises a CMOS integrated circuit.

19. The lighted footwear of claim 18, further comprising an ON/OFF switch connected to the logic circuit for selectively producing a deep sleep state in which the logic circuit is unresponsive to the inertia switch.

20. The lighted footwear of claim 19, wherein the CMOS integrated circuit comprises a control switch and a clock circuit, the control switch being connected to the inertia switch and the clock circuit, the clock circuit being connected to the ON/OFF switch, the deep sleep state being produced by the clock circuit being disabled in response to operation of the ON/OFF switch.

21. The lighted footwear of claim 20, wherein the ON/OFF switch makes momentary contact, the deep sleep state being entered and exited in response to alternate activations of the ON/OFF switch.

22. The lighted footwear of claim 11 wherein the battery is sealingly encapsulated within the enclosure.

23. The lighted footwear of claim 11 wherein the battery comprises a rechargeable battery module.

24. The lighted footwear of claim 23, further comprising a protective charging circuit connected to the battery module.

25. The lighted footwear of claim 24 wherein the battery module is located in a heel portion of the sole.

26. The lighted footwear of claim 25 wherein the protective charging circuit is located within the sole of the shoe.

27. The lighted footwear of claim 25 wherein the protective charging circuit is located in a fastening strap of the shoe.

28. Lighted footwear, comprising:
   a. footwear structure comprising a sole having toe and heel portions, and an upper for confining a wearer's foot on the sole;
   b. display apparatus comprising:
      i. a circuit module comprising an inertia switch comprising a stationary element and an elastic element, the elements being electrically conductive and making contact when the inertia switch is subjected to an effective acceleration; a CMOS logic circuit electrically connected to the inertia switch and including a control switch and a clock circuit, the control switch being connected to the inertia switch and the clock circuit; and a battery within the enclosure for powering the integrated circuit; and an enclosure sealingly encapsulating the inertia switch, the logic circuit, and the battery;
      ii. a plurality of illuminators;

iii. a wiring harness connected to the illuminators outside the enclosure and having an end portion sealingly extending into the enclosure and connecting the illuminators to plural points of the logic circuit, the logic circuit being configured for activating the illuminators in a predetermined activation sequence upon the inertia switch being subjected to the effective acceleration; and iv. the clock circuit being connected to an ON/OFF switch, a deep sleep state of the CMOS logic circuit being produced by the clock circuit being disabled in response to operation of the ON/OFF switch; and c. wherein:
  i. the encapsulated enclosure is located within the heel portion of the sole;
  ii. the ON/OFF switch is located on the upper and making momentary contact, the deep sleep state being entered and exited in response to alternate activations of the ON/OFF switch;
  iii. the activation sequence comprises a pair of activation cycles wherein at least some of the illuminators are flashed sequentially, the activation cycles being spaced by an inter cycle rest interval, the sequential flashings being spaced by an intra-cycle interval, the intra-cycle interval being shorter than the inter cycle rest interval; and
  iv. the illuminators are distributed on the footwear for external view.

* * * * *